(12) United States Patent
Hayashi

(10) Patent No.: US 7,209,251 B2
(45) Date of Patent: Apr. 24, 2007

(54) DOCUMENT INPUT/OUTPUT SYSTEM, APPARATUS MANAGEMENT SERVER AND METHOD FOR SETTING INFORMATION

(75) Inventor: Hisao Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 919 days.

(21) Appl. No.: 09/983,240

(22) Filed: Oct. 23, 2001

(65) Prior Publication Data

US 2002/0048052 A1   Apr. 25, 2002

(30) Foreign Application Priority Data

Oct. 25, 2000 (JP) .............................. 2000/324806

(51) Int. Cl.
  *G06F 13/00* (2006.01)
  *G06F 15/173* (2006.01)
  *G06F 11/00* (2006.01)
(52) U.S. Cl. .................. 358/1.15; 709/223; 714/25
(58) Field of Classification Search ............. 358/1.15, 358/404, 444; 382/112; 399/9, 1, 87, 403, 399/408; 714/25; 715/734; 709/224, 206, 709/230, 223
See application file for complete search history.

(56) References Cited

U.S. PATENT DOCUMENTS 6,240,456 B1 * 5/2001 Teng et al. ................ 709/230
6,665,425 B1 * 12/2003 Sampath et al. ............ 382/112
6,785,013 B1 * 8/2004 Ota et al. ................... 358/1.15
2002/0129141 A1 * 9/2002 Sogabe et al. .............. 709/224
2005/0055641 A1 * 3/2005 Machida ..................... 715/734

FOREIGN PATENT DOCUMENTS

| JP | H06-233037 A | 8/1994 |
| JP | H11-155052 A | 6/1999 |
| JP | H11-194986 A | 7/1999 |
| JP | H11-261754 A | 9/1999 |
| JP | 2000-162926 A | 6/2000 |

OTHER PUBLICATIONS

"Network printing solutions," Nikkei Computer, Japan, Nikkei BP-Sha, Jun. 19, 2000, vol. 498, pp. 251,264-266, 268, and 272.

* cited by examiner

*Primary Examiner*—Kimberly Williams
*Assistant Examiner*—Charlotte M. Baker
(74) *Attorney, Agent, or Firm*—Sughrue Mion, PLLC

(57) ABSTRACT

A management server transfers initial registration information to a registered information memory section of a document input/output apparatus. Upon completion of initial registration, the management server notifies by electronic mail the user's personal computer of the completion of registration, and displays from a www server a handling method and a method of software installation. The management server notifies by electronic mail the user's personal computer of replacement timing of expendables or any hardware trouble.

24 Claims, 15 Drawing Sheets

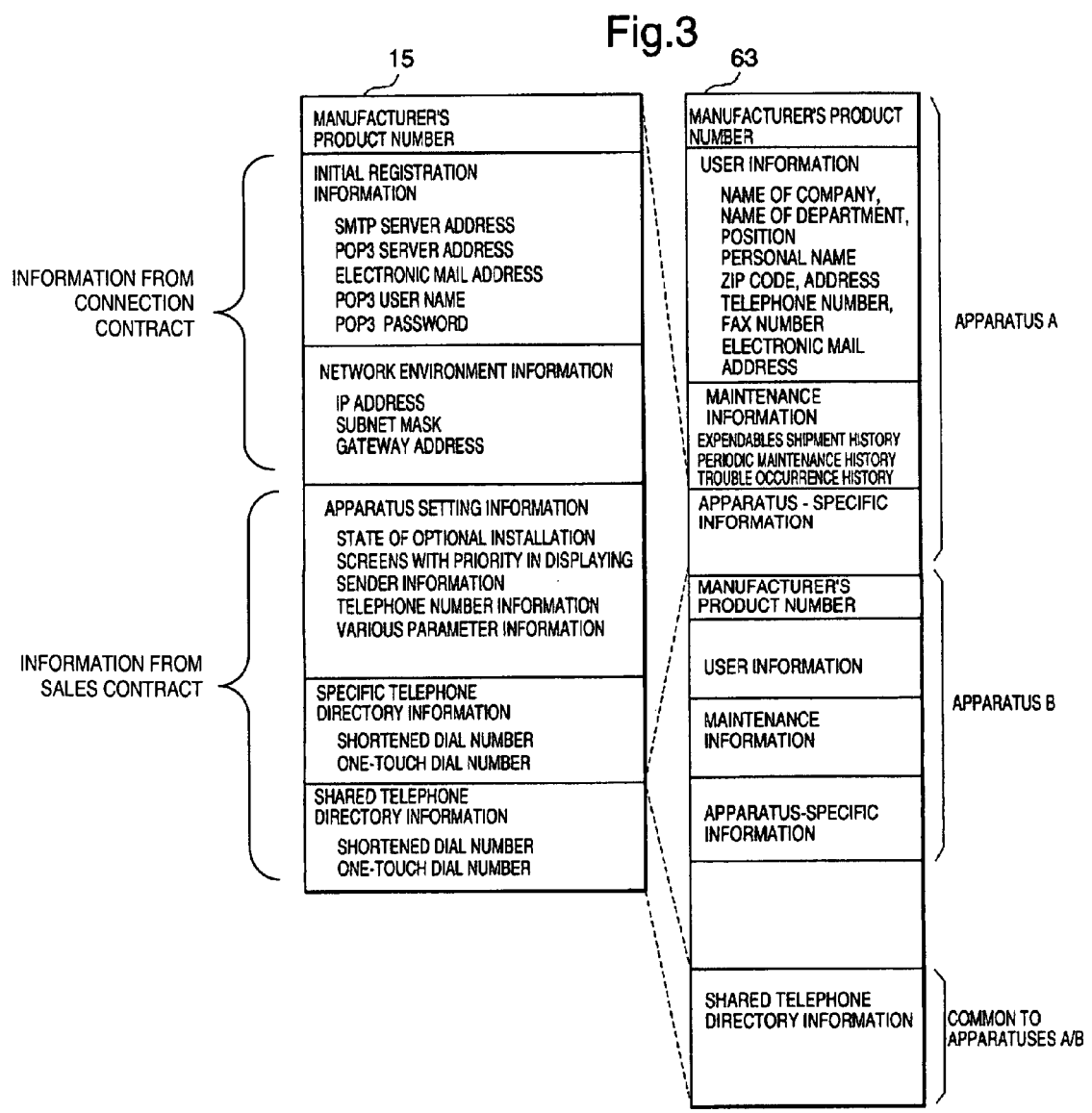

Fig.4

DATE : Wed.,9 Aug. 2000 12:02:37+0900

TO:xxx@nnn.co.jp

FROM:yyy@nnn.co.jp

SUBJECT : NOTICE OF COMPLETION OF INITIAL REGISTRATION FOR APPARATUS No. "1234567890"

Mr./ Ms.XXX
nnn COMPANY

THIS IS THE NETWORK MANAGEMENT CENTER.

WE HAVE THE PLEASURE OF ADVISING YOU OF THE INITIAL REGISTRATION FOR THE FOLLOWING APPARATUS.

APPARATUS NAME:○○○○○03500

PRODUCT No:1234567890

IP ADDRESS:10.42.33.201

ELECTRONIC MAIL ADDRESS:zzz@nnn.co.jp

FOR CHECKING THE HARDWARE STATE OR VARIOUS REGISTRATIONS, PLEASE LOOK AT THE FOLLOWING www SERVER:

Http://10.42.33.201/index html

FOR THE METHOD TO HANDLE THE APPARATUS OF THE INSTALLATION OF SOFTWARE ON YOUR PC,PLEASE LOOK AT THE FOLLOWING wwwSERVER:

Http://ipc .nnn.co.jp/japanese /product /○○○○○/index.html

Fig.5

DATE : Wed.,9 Aug. 2000 12:02:37+0900
TO:xxx@nnn.co.jp
FROM:yyy@nnn.co.jp
SUBJECT : REMINDER OF TONER REPLACEMENT FOR APPARATUS No. "1234567890"

Mr./ Ms.XXX
nnn COMPANY

THIS IS THE NETWORK MANAGEMENT CENTER.
WE HAVE THE PLEASURE OF REMINDING YOU OF THE SCARCE REMAINING TONER IN THE FOLLOWING APPARATUS.

APPARATUS NAME:○○○○○03500
PRODUCT No:1234567890
IP ADDRESS:10.42.33.201
ELECTRONIC MAIL ADDRESS:zzz@nnn.co.jp FOR CHECKING THE HARDWARE STATE OR VARIOUS REGISTRATIONS, PLEASE LOOK AT THE FOLLOWING www SERVER:
Http://10.42.33.201/index.html FOR THE METHOD TO HANDLE THE APPARATUS OF THE INSTALLATION OF SOFTWARE ON YOUR PC,PLEASE LOOK AT THE FOLLOWING www SERVER:
Http://ipc .nnn.co.jp/japanese /product /○○○○○/index.html

Fig.6

```
DATE : Wed.,9 Aug. 2000 12:02:37+0900
TO:xxx@nnn.co.jp
FROM:yyy@nnn.co.jp
SUBJECT : NOTICE OF HARDWARE TROUBLE IN APPARATUS No.
"1234567890"

Mr./ Ms.XX
 nnn COMPANY

THIS IS THE NETWORK MANAGEMENT CENTER.
WE REGRET TO ADVISE YOU OF SOME TROUBLE HAVING OCCURRED IN THE
FOLLOWING APPARATUS.
  APPARATUS NAME:○○○○○03500
  PRODUCT No:1234567890
  IP ADDRESS:10.42.33.201
  ELECTRONIC MAIL ADDRESS: zzz@nnn.co.jp
  TROUBLED PART : HEATER OF RECORDING SECTION OUR MAINTENANCE WILL VISIT YOUR OFFICE FOR REPAIR. PLEASE BE
KIND ENOUGH TO WAIT SOME TIME.
```

Fig.8

ALARM MONITOR

ALARM MESSAGE

| PAPER SIZE /IS THERE PAPER? | | |
|---|---|---|
| 1st LEVEL | A4Y | YES |
| 2nd LEVEL | A4 | YES |
| 3rd LEVEL | A3 | YES |
| 4th LEVEL | A4Y | YES |

ALARM ICON

APPARATUS NAME:○○○○

OPTIONAL CONFIGURATION

RESULT OF TRANSMISSION  TO TOP PAGE

| DESTINATION | DAY/HOURS OF ACCEPTANCE | No.OF SHEETS | RESULT OF COMMUNI-CATION |
|---|---|---|---|
| ◇◇ ◇◇ | 08/28 21:43 | 001 | TRANSMITTED(OK) |
| △△ △△ | 08/28 18:22 | 001 | TRANSMITTED(OK) |
| ▽▽ ▽▽ | 08/28 16:42 | 170 | TRANSMITTED(OK) |
| ◇◇ ◇◇ | 08/28 14:40 | 002 | TRANSMITTED(OK) |
| △△ △△ | 08/25 17:13 | 006 | TRANSMITTED(OK) |
| ▽▽ ▽▽ | 08/25 13:59 | 002 | TRANSMITTED(OK) |
| ◇◇ ◇◇ | 08/25 11:04 | 007 | TRANSMITTED(OK) |

Fig.9

| REGISTRATION/REFERENCE | | NETWORK SETTING | |
|---|---|---|---|
| SHORTENED | | REGISTER  CANCEL | |
| ONE-TOUCH | | | |
| INDEX | IP ADDRESS: | 10.42.33.201 | |
| ALL BOX LIST | SUBNET ADDRESS: | 255.255.255.0 | |
| MAINTENANCE BY MANAGER | GATEWAY: | 10.42.33.253 | |
| INITIAL SETTING | SMTP SERVER ADDRESS: | 10.42.32.20 | |
| USER REGISTRATION | POP3 SERVER ADDRESS | 10.42.32.20 | |
| CUMULATIVE NUMBER OF SHEETS | SERVER DOMAIN NAME: | nnn.co.jp | (39 HALF-WIDTH CHARACTERS) |
| POWER SAVE SETTING | AUTOMATIC ARRIVAL CONFIRMATION: | ○ NO AUTOMATIC  ● AUTOMATIC CONFIRMATION       CONFIRMATION | [1] MINUTES (1~99) |
| NETWORK SETTING | E-MAIL ADDRESS: | xxx | (24 HALF-WIDTH CHARACTERS) |
| LOG OUT | POP3 USER NAME: | xxx | (12 HALF-WIDTH CHARACTERS) |
| | POP3 PASSWORD: | **** | (8 HALF-WIDTH CHARACTERS) |
| IF YOU PRESS "LOG OUT" BUTTON, ACTION WILL BE RESUMED, AND TOP PAGE WILL BE SHOWN AGAIN. | REGISTER THE OTHER PARTY TO SCANNER?: | ● YES  ○ NO | |
| | NOTIFY RESULT? | ○ YES  ● NO | |
| | PRINT RECEPTION HEADER? | ○ YES  ● NO | |

Fig.10

| REGISTRATION/REFERENCE |
|---|
| SHORTENED |
| ONE-TOUCH |
| INDEX |
| ALL BOX LIST |
| MAINTENANCE BY MANAGER |
| INITIAL SETTING |
| USER REGISTRATION |
| CUMULATIVE NUMBER OF SHEETS |
| POWER SAVE SETTING |
| NETWORK SETTING |

LOG OUT

IF YOU PRESS "LOG OUT" BUTTON, ACTION WILL BE RESUMED, AND TOP PAGE WILL BE SHOWN AGAIN.

ONE-TOUCH

| MULTI CASTING | M/E | SUPER INTENDENT | CONTACT PERSON |
|---|---|---|---|
| — | — | — | — |
| — | — | — | — |
| — | — | — | — |

MULTI CASTING

| | ME MULTI CASTING | SUPERINTENDENT MULTI CASTING | CONTACT PERSON MULTI CASTING |
|---|---|---|---|
| 1st. Dev. MULTI CASTING ▽▽ | ◇◇ | — | — |
| NOTE PC | ○○○○○ | — | — |

SUPERINTENDENT

| ▽▽ | ◇◇ | □□ | — |
|---|---|---|---|
| — | — | — | — |

CONTACT PERSON

| △△ | — |
|---|---|

Fig.11

ONE-TOUCH:HELP

REGISTER  CANCEL  DELETE ENTRY

⊘ THE OTHER PARTY'S NAME : YYY  (6 FULL-WIDTH CHARACTERS, 12 HALF-WIDTH CHARACTERS)
SHORTENED NUMBER : #044

⊘ THE OTHER PARTY'S ADDRESS:  yyy@nnn.co.jp

COMMUNICATION MODE:  E-mail ▶

TRANSMIT SIZE (MAX):  ○A4  ○B4  ⊙A3

TRANSMIT PICTURE QUALITY (MAX):  ○200dpi(FINE /HALFTONE)
○400dpi(SUPER- FINE /SUPER- HALFTONE)
⊙600dpi(SUPER- FINE /SUPER- HALFTONE)

ENCODING FORMULA:  ⊙MH  ○MR  ○MMR  ○JBIG

MFP AGENT

REGISTRATION/REFERNCE
SHORTENED
ONE-TOUCH
INDEX
ALL BOX LIST
MAINTENANCE BY MANAGER
INITIAL SETTING
USER REGISTRATION
CUMULATIVE NUMBER OF SHEETS
POWER SAVE SETTING
NETWORK SETTING

LOG OUT

IF YOU PRESS "LOG OUT" BUTTON , ACTION WILL BE RESUMED, AND TOP PAGE WILL BE SHOWN AGAIN.

DOCUMENT INPUT/OUTPUT SYSTEM, APPARATUS MANAGEMENT SERVER AND METHOD FOR SETTING INFORMATION

BACKGROUND OF THE INVENTION

1. Field of the Invention

The present invention relates to a document input/output system and a setting information registration method for use by the system, and more particularly to a setting information registration method for us
e by a document input/output apparatus integrating the copying, facsimile, printing and scanning functions (multifunctional machine).

2. Description of the Related Art

The demand for multifunctional machines integrating the copying, facsimile, printing and scanning functions is now rising to save the installation space or to reduce the cost through the use of common expendable items.

Furthermore, reflecting the expanding use of intranets and the Internet, there are realized the Internet facsimile (fax) function of communicating image data via the Internet by connecting multifunctional machines to the network and the network printer or network scanner function of using a printer or a scanner via a network from a plurality of personal computers (PCs).

The multifunctional machines according to the prior art described above, which perform diverse functions, impose increased workloads on the personnel responsible for their delivery and installation because there are more items to be registered with the machines and additional information regarding their operation and precautions to be explained to their users after the delivery and installation.

On the other hand, the manufacturers of multifunctional machines, who earn considerable profits from the supply of expendable items including recording paper and toner, are called upon to be well aware of the replacement timings of the expendables and to be quick in response to users' needs as recycling businesses are increasingly making inroads into the market for such expendables.

SUMMARY OF THE INVENTION

An object of the present invention, therefore, is to obviate the above-noted problems, and to provide a document input/output system and a setting information registration method for use by the system, capable of avoiding faulty initial setting due to erroneous operation or the like, readily restoring information lost by trouble or mishandling, and enhancing reliability.

Another object of the invention is to provide a document input/output system and a setting information registration method for use by the system, capable of reducing the items of operation and enhancing the ease of operation.

Still another object of the invention is to provide a document input/output system and a setting information registration method for use by the system, capable of readily checking the operating state of a multifunctional machine per se, the remaining volumes of expendables and the presence or absence of trouble and enhancing maintenance ease.

A document input/output system according to the invention comprises at least a document input/output apparatus integrating a copying function, a facsimile function, a printing function and a scanning function, provided with a management server for managing individual items of management information of the document input/output apparatus, and communication means, of which one unit each is provided for the document input/output apparatus and the management server, for communicating the management information via a network.

Another document input/output system according to the invention combines, in the configuration described above, a connection contract needed for the document input/output apparatus and the management server to communicate via the network with a sales contract for the document input/output apparatus.

Still another document input/output system according to the invention of the configuration described above, wherein each of the document input/output apparatus and the management server has a means for transmitting and receiving electronic mails and a means for displaying contents on the Internet, provides by using the electronic mail and the contents a terminal unit connected to the network with at least the completion of the initial setting procedure, the confirmation of the hardware state, the additional registration of any apparatus, the installation of software in the terminal unit, a notice of the replacement timing of expendables used by the printing function and a notification of any hardware trouble.

By a setting information registration method for a document input/output system according to the invention, intended for a document input/output system comprising at least a document input/output apparatus integrating a copying function, a facsimile function, a printing function and a scanning function, management information is communicated via a network between a management server for managing the individual items of the management information of the document input/output apparatus and the document input/output apparatus itself.

By another setting information registration method for a document input/output system according to the invention, in the processing described above, a connection contract needed for the document input/output apparatus and the management server to communicate via the network is combined with a sales contract for the document input/output apparatus.

By another setting information registration method for a document input/output system according to the invention, uses a means for transmitting and receiving electronic mails and a means for displaying contents on the Internet of each of the document input/output apparatus and the management server, a terminal unit connected to the network is provided with at least the completion of the initial setting procedure, the confirmation of the hardware state, the additional registration of any apparatus, the installation of software in the terminal unit, a notice of the replacement timing of expendables used by the printing function and a notification of any hardware trouble.

Thus, a document input/output system according to the invention is provided in its document input/output apparatus with a management server having an information storage means and a communication means, and its configuration permits management information to be communicated between the document input/output apparatus and the management server via a network.

Also, a document input/output system according to the invention combines, at the time its document input/output apparatus is sold, a connection contract needed for connecting the document input/output apparatus to a network with the sales contract, and registers in advance settings required for connecting the management server to the document input/output apparatus. On the other hand, information on the user of the document input/output apparatus is registered with the management server in advance.

By merely accomplishing the minimum required settings for connecting the document input/output apparatus to a network when the apparatus is delivered to its user, it is made possible to transfer the items of necessary setting for the operation of the apparatus from the management server. Accordingly the workload of registration at the time of delivery and installation can be reduced.

In this way, it is made possible to avoid faulty initial setting due to erroneous operation or the like, and to readily restore lost information due to trouble or mishandling of the multifunctional machine per se by transferring the pertinent information from the management server, resulting in enhanced reliability of the system.

Also, as the management server notifies the user's personal computer of relevant information including the method of handling the document input/output apparatus, the workload of explaining the handling method can be dispensed with. At the same time, as the management server automatically executes initial setting of the multifunctional machine per se via a network, the number of items of handling can be reduced, resulting in enhanced handling ease. In this case, it is made possible for a plurality of multifunctional machines to share the management server, and the same address information and the like need not be registered with each individual multifunctional machine. This, too, contributes to enhancing the ease of handling.

Notification of the replacement timing of expendables or of any hardware trouble by the management server by electronic mail enables the apparatus manufacturer to smoothly manage its expendables trade, and makes quickly responsive maintenance service available to the user. Thus it is made possible to check the operating state of the multifunctional machine per se, the remaining volumes of expendables and the presence or absence of trouble on the www server, and the replacement timing of expendables or of any hardware trouble is notified by electronic mail, resulting in enhanced maintenance ease.

BRIEF DESCRIPTION OF THE DRAWINGS

FIG. 3 illustrates an example of sets of information stored in the registered information memory section of the document input/output apparatus and the information storage section of the management server shown in FIG. 1.

FIG. 4 illustrates an example of electronic mail for notifying the user of the completion of initial registration by the embodiment of the invention.

FIG. 5 illustrates an example of electronic mail for notifying the user of the replacement timing of an expendable item for the embodiment of the invention.

FIG. 6 illustrates an example of electronic mail for notifying the user of the occurrence of trouble in the embodiment of the invention.

FIG. 8 illustrates an example of www server showing the result of transmission displayed by the document input/output apparatus in the embodiment of the invention.

FIG. 9 illustrates an example of www server showing a network setting change in the document input/output apparatus in the embodiment of the invention.

FIG. 10 illustrates an example of www server showing a one-touch dial setting change in the document input/output apparatus in the embodiment of the invention.

FIG. 11 illustrates another example of www server showing a one-touch dial setting change in the document input/output apparatus in the embodiment of the invention.

DETAILED DESCRIPTION OF THE PREFERRED EMBODIMENTS

Figure 1:
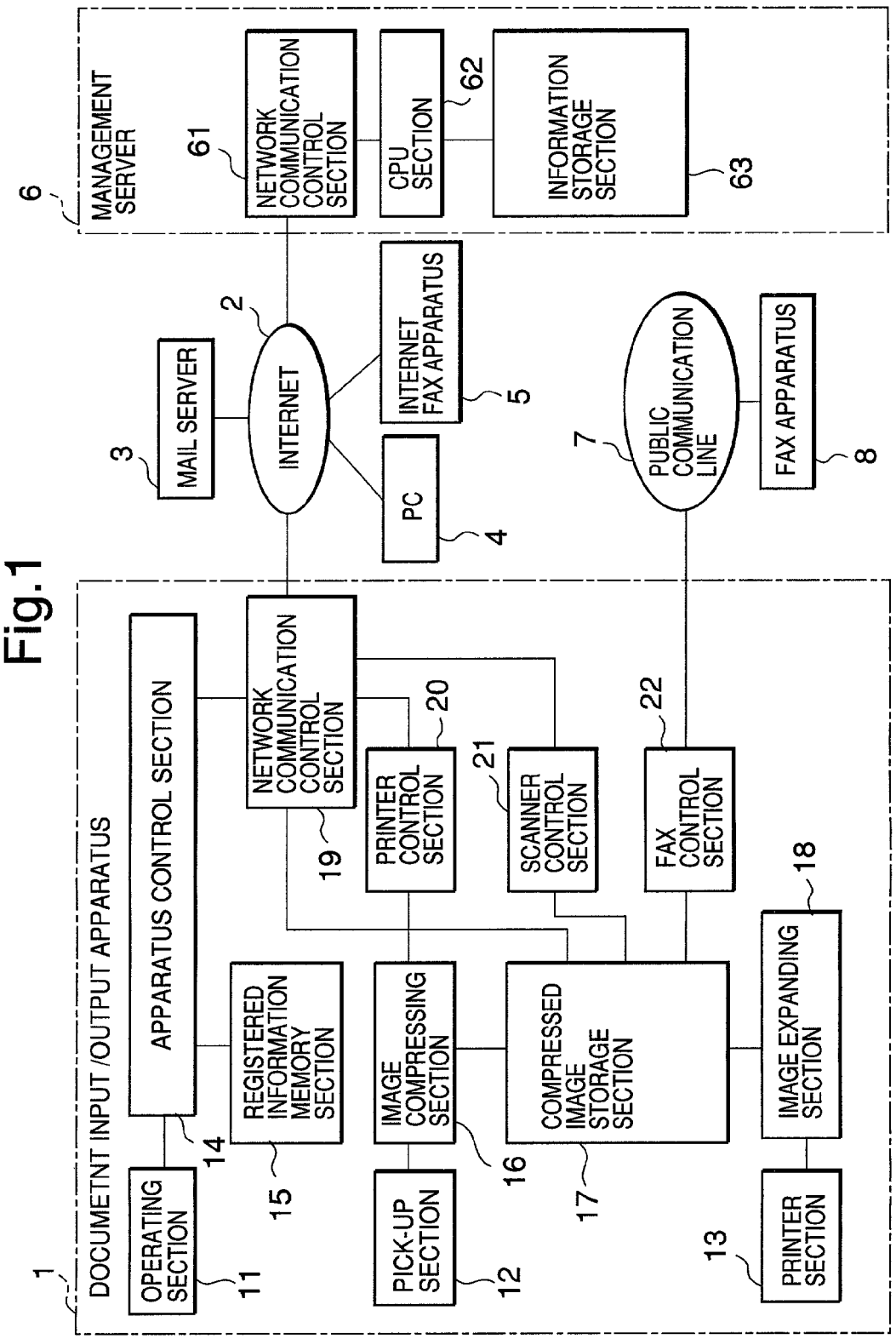
FIG. 1 is a block diagram illustrating the configuration of a document input/output system, which is a preferred embodiment of the present invention.

Next will be described preferred embodiments of the present invention with reference to the accompanying drawings. FIG. 1 is a block diagram illustrating the configuration of a document input/output system, which is a preferred embodiment of the invention. FIG. 1 shows a typical configuration in which the document input/output system connected to the Internet 2.

A document input/output apparatus (multifunctional machine) 1 has a copying function, a printing function, a scanning function, a fax function and an Internet fax function. Each of these functions will be described below.

The copying function is realized by entering the number of needed copies from an operating section 11, setting a subject copy in a pick-up section 12, compressing image information on the subject copy picked up by the pick-up section 12 in an image compressing section 16, and temporarily storing the compressed image information in a compressed image storage section 17. The compressed image information stored in the compressed image storage section 17 is expanded by an image expanding section 18 when a printer section 13 is readied for printing, and is printed by the printer section 13 in a designated number of copies.

The printing function is realized by sending print data supplied from a personal computer (PC) 4 connected via a network to a printer control section 20 via a network communication control section 19, where the print data are converted into image information, compressing the converted information in the image compressing section 16, and temporarily storing the compressed information in the compressed image storage section 17. The compressed image information stored in the compressed image storage section 17, when the printer section 13 is readied for printing, is expanded by the image expanding section 18 and printed by the printer section 13. Though not shown, the printer control section 20 may be directly connected to the PC 4 by a Centronics cable or the like.

The scanning function is realized by setting the subject copy in the pick-up section 12, compressing in the image compressing section 16, upon instruction of scanning input from the PC 4 connected via a network, the image information of the subject copy picked up by the pick-up section 12, and temporarily storing it in the compressed image storage section 17. The compressed image information stored in the compressed image storage section 17 is converted into a designated data form by a scanner control section 21, and transferred to the PC 4 via the network communication control section 19.

Though not shown, the scanner control section 21 may be directly connected to the PC 4 by a SCSI (small computer system interface) cable or the like.

The fax transmitting function is realized by entering from the operating section 11 the destination of transmission, setting the subject copy in the pick-up section 12, compressing in the image compressing section 16 the image information of the subject copy picked up by the pick-up section 12, and temporarily storing the compressed information in the compressed image storage section 17. The compressed image information stored in the compressed image storage section 17 is converted into a fax data form by a fax control section 22, and transmitted to a fax apparatus 8 via a public communication line 7 such as the ISDN (Integrated Services Digital Network) or the like.

The fax receiving function is realized by receiving at the fax control section 22 image information transmitted from the fax apparatus 8 via the public communication line 7, and temporarily storing the received image information in the compressed image storage section 17. The compressed image information stored in the compressed image storage section 17, when the printer section 13 is readied for printing, is expanded by the image expanding section 18 and printed by the printer section 13.

The Internet fax transmitting function is realized by entering a destination transmitted from the operating section 11, setting the subject copy in the pick-up section 12, compressing in the image compressing section 16 the image information of the subject copy picked up by the pick-up section 12, and temporarily storing the compressed information in the compressed image storage section 17. The compressed image information stored in the compressed image storage section 17 is converted by the network communication control section 19 into the Internet fax data form, and transmitted via the Internet 2 to the PC 4 or an Internet fax apparatus 5.

The Internet fax receiving function is realized by receiving at the network communication control section 19 via the Internet 2 image information transmitted from the Internet fax apparatus 5, and temporarily storing the received image information in the compressed image storage section 17. The compressed image information stored in the compressed image storage section 17, when the printer section 13 is readied for printing, is expanded by the image expanding section 18 and printed by the printer section 13.

Here, an apparatus control section 14 performs control over the whole document input/output apparatus 1, and registered information required for realizing the functions described under the control of the apparatus control section 14 is stored in a registered information memory section 15.

A management server 6 is configured of a CPU (central processing section) section 62 performing control over the whole server and an information storage section 63, and is connected to the Internet 2 by a network communication control section 61.

The management server 6 transfers initial registration information to the registered information memory section 15 of the document input/output apparatus 1. Upon completion of the initial registration, the management server 6 notifies the user's PC 4 of the completion of registration by electronic mail and displays from the www server the handling method and the method of software installation. The management server 6 notifies the user's the PC 4 of the replacement timing of expendables or of any hardware trouble by electronic mail.

Figure 2:
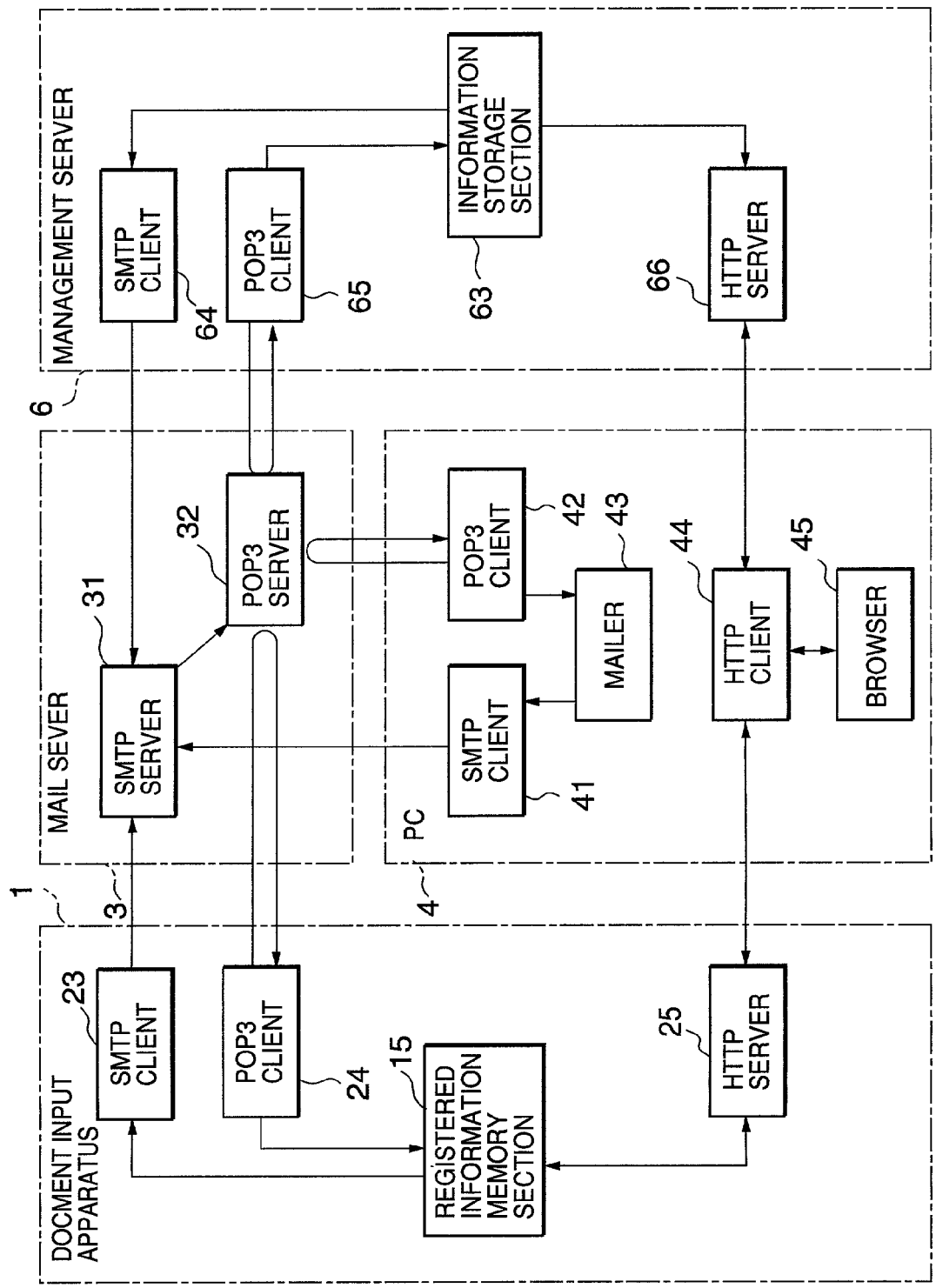
FIG. 2 is a block diagram illustrating the communicating functions of different parts of the document input/output system, which is the preferred embodiment of the invention.

FIG. 2 is a block diagram illustrating the communicating functions of different parts of the document input/output system, which is this embodiment of the invention. Referring to this FIG. 2, the function of electronic mail communication between a usual mail server and a PC will be described.

A mail server 3 is configured of an SMTP (simple mail transfer protocol) server 31 and a POP3 (post office protocol version 3) server 32. Here, the SMTP server 31 has a function to know the SMTP server and the POP3 server to which an electronic mail address is to be transferred, and a POP3 user name and a POP3 password for authenticating a POP3 client is registered with the POP3 server 32.

On the other hand, the PC 4 is configured of an SMTP client 41, a POP3 client 42 and a mailer 43 for generating or displaying an electronic mail. Hereupon, the SMTP server address to be connected to and the electronic mail address of this system's own are registered with the SMTP client 41, and the POP3 server address to be corrected to and the POP3 user name and the POP3 password for authentication are registered with the POP3 client 42.

When an electronic mail is to be transmitted from the PC 4, the electronic mail generated by the mailer 43 is transmitted to the SMTP server 31 of the mailer 43 via the SMTP client 41 together with an electronic mail address, which is the destination.

The SMTP server 31 figures out from the electronic mail address the SMTP server and the POP3 server to which the electronic mail is to be transferred and transfers it. The electronic mail is finally transferred to the POP3 server, which is its destination and with which the electronic mail address is registered.

Where an electronic mail is to be received by the PC 4 the mailer 43 either automatically or manually actuates the POP3 client 42. The POP3 client 42 transmits the user name POP3 and the POP3 password to the POP3 server 32 for authentication, inquires of the POP3 server 32 whether or not there is any electronic mail addressed to its own apparatus and, if there is any, accepts the electronic mail from the POP3 server 32. The accepted electronic mail, together with the sender's electronic mail, is displayed by the mailer 43.

Now will be described the www server communicating function between a usual HTTP (hyper text transfer protocol) server and a PC. The PC 4 is provided with an HTTP client 44 and a browser 45. When the address of the www server to be displayed is designated in the browser 45, the HTTP client 44 accepts www server information from the pertinent HTTP server and displays it on the browser 45.

Next will be described operations for communication taking place between the document input/output apparatus 1 and the management server 6. The network communication control section 19 of the document input/output apparatus 1 is provided with an SMTP client 23, a POP3 client 24 and an HTTP server 25. Here, the address of the SMTP server 31 of the mail server 3 is registered with the SMTP client 23; the address, the POP3 user name and the POP3 password of the mail server 3 are registered with the POP3 client 24; the IP (Internet Protocol) address of the document input/output apparatus 1 is registered with the HTTP server 25; and these registered items of information are stored in the registered information memory section 15.

On the other hand, the network communication control section 61 of the management server 6 is provided with an SMTP client 64, a POP3 client 65 and an HTTP server 66. Here, the address of the SMTP server 31 of the mail server 3 is registered with the SMTP client 64; the address, the POP3 user name and the POP3 password of the mail server 3 are registered with the POP3 client 65; the IP address of the management server 6 is registered with the HTTP server 66; and these registered items of information are stored in an information storage section 63.

This arrangement enables the registered information memory section 15 of the document input/output apparatus 1 and the information storage section 63 of the management server 6 to exchange information by electronic mail via the mail server 3.

Further, the document input/output apparatus 1 and the management server 6 can transmit electronic mails to the PC 4 via the mail server 3, and the PC 4 can have access to the www server displayed by the document input/output apparatus 1 and the management server 6.

FIG. 3 illustrates an example of sets of information (i.e., management information) stored in the registered information memory section 15 of the document input/output apparatus 1 and the information storage section 6 of the management server 6 shown in FIG. 1. Referring to FIG. 3, the manufacturer's product number, initial registration information, network environment information, apparatus setting information, specific telephone directory information and shared telephone directory information are stored in the registered information memory section 15.

The manufacturer's product number, which is a specific information item for identifying the apparatus, is registered at the time of manufacturing the document input/output apparatus 1 in the factory. The initial registration information (i.e.. connection information that is part of the information from a connection contract), which comprises necessary information items (SMTP server address, POP3 server address, electronic mail address, POP3 user name and POP3 password) for communicating with the management server 6 via the mail server 3, is registered at a distribution center (not shown) immediately before the document input/output apparatus 1 is delivered to its user. Here, the initial registration information (i.e.. connection information that is part of the information from a connection contract) is made definite at the time of selling the document input/output apparatus 1 by inputting the information from a provider contract into the initial registration information (i.e.. connection information that is part of the information from a connection contract) for using the mail server 3.

The network environment information (i.e., initial communication information that is part of the information from the connection contract), which comprises necessary information items (the IP address, a subnet mask and a gateway address) for connecting the document input/output apparatus 1 to the user's network, is registered at the time of delivering the document input/output apparatus 1 to its user after checking with the user.

The apparatus setting information comprises such information as not absolutely required to be set for the operation of the document input/output apparatus 1 but is registered at the user's option for greater convenience (the state of optional installation, screens with priority in displaying, sender information, telephone number information and information on various parameters). Usually, the sender information and the telephone number information are registered at the time of installation, but other items of information are often used as they were at the time of shipping the apparatus.

The telephone directory information is registered to shorten the procedure of designating the destination by the document input/output apparatus 1. A highly functionalized document input/output apparatus 1 now available can accommodate registration of hundreds of shortened dial numbers and one-touch dial numbers.

In large companies in particular, as a plurality of document input/output apparatuses 1 often share a single set of telephone directory information, there may be shared telephone directory information in addition to specific telephone directory information.

In the information storage section 63 are stored, as specific information, the manufacturer's product number, user information, maintenance information and apparatus-specific information for each of apparatuses A and B and, as shared information, shared telephone directory information.

The manufacturer's product number is information for identifying the document input/output apparatus 1. The user information comprises information items (name of company, name of department, position, personal name, ZIP code, address, telephone number, fax number and electronic mail address) to be referenced when an electronic mail is to provide the user's PC with individualized service information.

The maintenance information comprises information items (expendables shipment history, periodic maintenance history and trouble occurrence history) to be referenced in maintenance work. The apparatus-specific information comprises items of information specific to the apparatus among the information stored in the registered information memory section 1. The shared telephone directory information is intended to enable a plurality of document input/output apparatuses 1 to share a common telephone directory.

Next will be described how information is exchanged between the registered information memory section 15 and the information storage section 63. At the time of selling the document input/output apparatus 1, acquired user information and initial registration information are stored into the information storage section 63. If there are any apparatus setting information specifically desired by the user or telephone directory information before the replacement of the apparatus, they are also registered with the information storage section 63.

At the time the document input/output apparatus 1 is delivered to the user and installed, the network environment information is confirmed with the user and registered. Then the management server 6 is connected to the document input/output apparatus 1 via the Internet, the information registered with the information storage section 63 is transferred to the registered information memory section 15 to complete initial registration.

FIG. 4 illustrates an example of electronic mail for notifying the user of initial registration by this embodiment of the invention. FIG. 4 shows an example in which the user is notified, at the time the initial registration is completed, of the completion by electronic mail from a network management center (not shown).

In the case of this example, the network management center notifies the user of the apparatus name (□□□□ 03500), product number (1234567890), IP address (10.42.33.201) and electronic mail address (zzz@nnn.co.jp). At the same time, the user is also notified that the state of the apparatus can be checked or various information items can be registered at the www server of "Http://10.42.33.201/index.html" and the handling method of the apparatus and the method of installing software in the PC are available from the www server of "Http://ipc.nnn.co.jp/japanese/product/☐☐☐☐☐/index.html".

FIG. 5 illustrates an example of electronic mail for notifying the user of the replacement timing of an expendable item for the embodiment of the invention. FIG. 5 shows an example in which the network management center (not shown) notifies the user, when an expendable item (toner) has run out, of the replacement timing of the expendable item (toner) by electronic mail.

In this case, the network management center notifies the user of the apparatus name (☐☐☐☐ 03500), product number (1234567890), IP address (10.42.33,201) and electronic mail address (zzz@nnn.co.jp). At the same time, the user is also notified that the state of the apparatus can be checked or various information items can be registered at the www server of "Http://10.42.33.201/index.html" and the handling method of the apparatus and the method of installing software in the PC are available from the www server of "Http://ipc.nnn.co.jp/japanese/product/☐☐☐☐☐/index.html".

FIG. 6 illustrates an example of electronic mail for notifying the user of the occurrence of trouble in the embodiment of the invention. FIG. 6 shows an example in which the network management center (not shown) notifies the user by electronic mail of the occurrence of trouble.

In this case, the network management center notifies the user of the apparatus name (☐☐☐☐ 03500), product number (1234567890), IP address (10.42.33,201), electronic mail address (zzz@nnn.co.jp) and troubled part (the heater of the recording section), and that service personnel will come and repair the apparatus.

Figure 7:
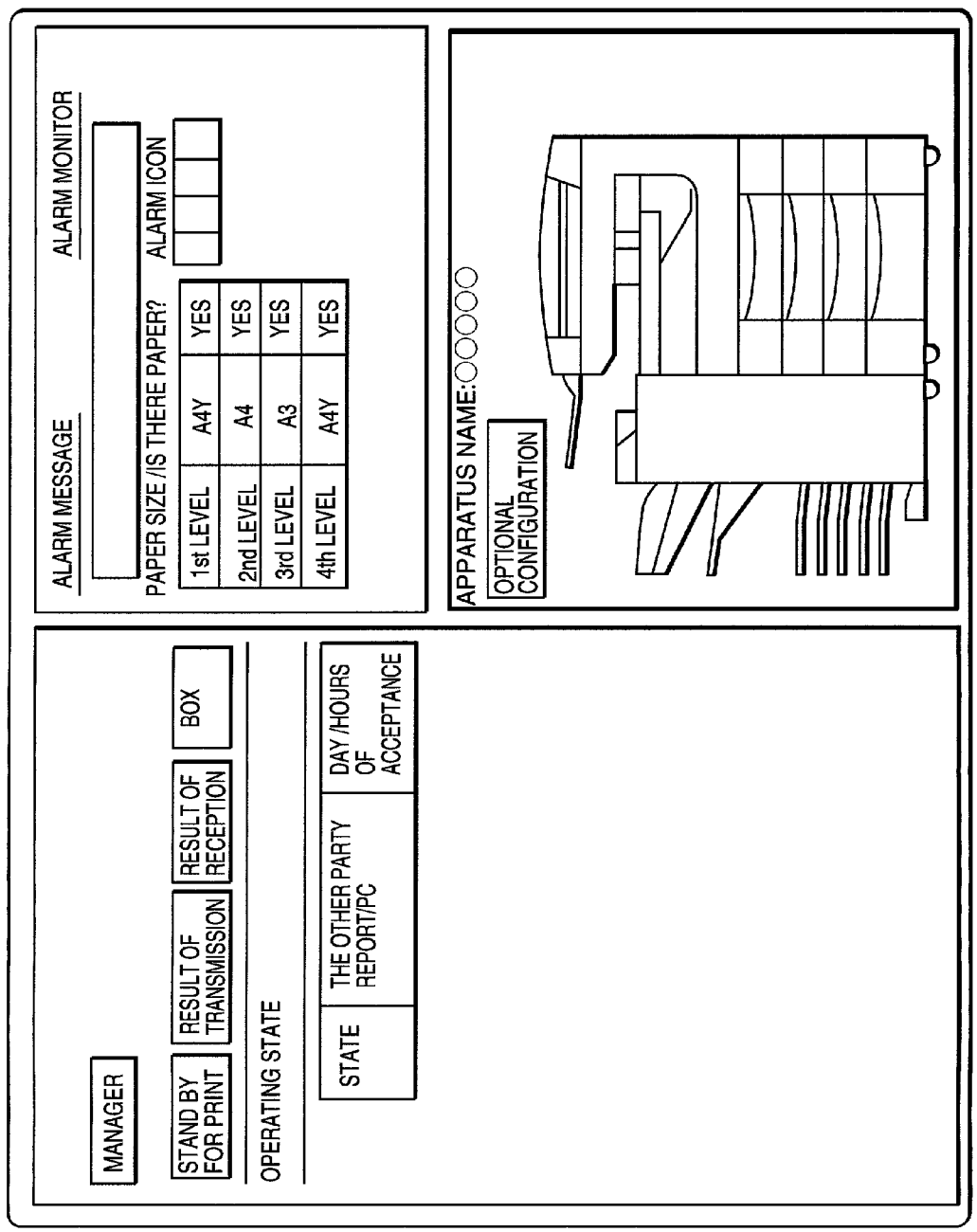
FIG. 7 illustrates an example of www server showing the operating state of hardware displayed by the document input/output apparatus in the embodiment of the invention.

FIG. 7 illustrates an example of www server showing the operating state of hardware displayed by the document input/output apparatus 1 in this embodiment of the invention. In FIG. 7, this www server displays such aspects of the operating state as "State", "The other party/Report/PC" and "Day/hours of acceptance". At the same time, it can also optionally display an alarm message, paper size/presence or absence of paper and apparatus name (☐☐☐☐☐).

FIG. 8 illustrates an example of www server showing the result of transmission displayed by the document input/output apparatus 1 in this embodiment of the invention. In FIG. 8, this www server displays the result of fax transmission comprising "the other party", "date/hours of acceptance", "number of sheets" and "result of communication". At the same time, it can also optionally display an alarm message, paper size/presence or absence of paper and apparatus name (☐☐☐☐☐)

FIG. 9 illustrates an example of www server showing a network setting change in the document input/output apparatus 1 in this embodiment of the invention. In FIG. 9, this www server displays a network setting page on the right side of the drawing out of the menu on the left side (registration/reference, shortened, one-touch, index, all box list, maintenance by manager, initial setting, user registration, cumulative number of sheets, power save setting and network setting) when the operator clicks "network setting" in the menu.

In the network setting page, the IP address (10.42.33.201), subnet address (255.255.255.0) and gateway (10.42.33.253) are displayed, and variable items that are displayed are the SMTP server address (10.42.32.20), POP3 server address (10.42.32.20), server domain name (nnn.co.jp), automatic arrival confirmation, electronic mail address (xxx), POP3 user name (xxx), POP3 password (****), the other party to scanner registration, result notification and reception header printing.

Here, even if the setting is changed during the operation of the document input/output apparatus 1, information is transferred from the document input/output apparatus 1 to the management server 6 from time to time to ensure synchronization of information.

FIG. 10 and FIG. 11 illustrate examples of www server showing a one-touch dial setting change in the document input/output apparatus 1 in this embodiment of the invention. In FIG. 10, this www server displays a one-touch setting page on the right side of the drawing out of the menu on the left side (registration/reference, shortened, one-touch, index, all box list, maintenance by manager, initial setting, user registration, cumulative number of sheets, power save setting, network setting) when the operator clicks "one-touch" in the menu.

When the operator clicks what is to be changed in the one-touch items (multicasting, M/E, superintendent, contact person, etc.) on the page displayed on the right side of this diagram, the screen shifts to what is shown in FIG. 11. On the same page as it is shown in FIG. 11, as the other party's name (YYY), shortened number (#044), the other party's address (yyy@nnn.co.jp), communication mode (e.g., electronic mail), transmit size (maximum) (A4, B4, A3), transmit picture quality (maximum) [200 dpi (fine/halftone), 400 dpi (super-fine/super-halftone), 600 dpi], encoding formula [MH (modified Huffman), MR (modified READ (relative element address designate)), MMR (modified modified READ) and JBIG (joint bi-level image experts group)] are displayed on this page, the operator can move the cursor to the item where a change is desired and enter the desired change.

Figure 12:
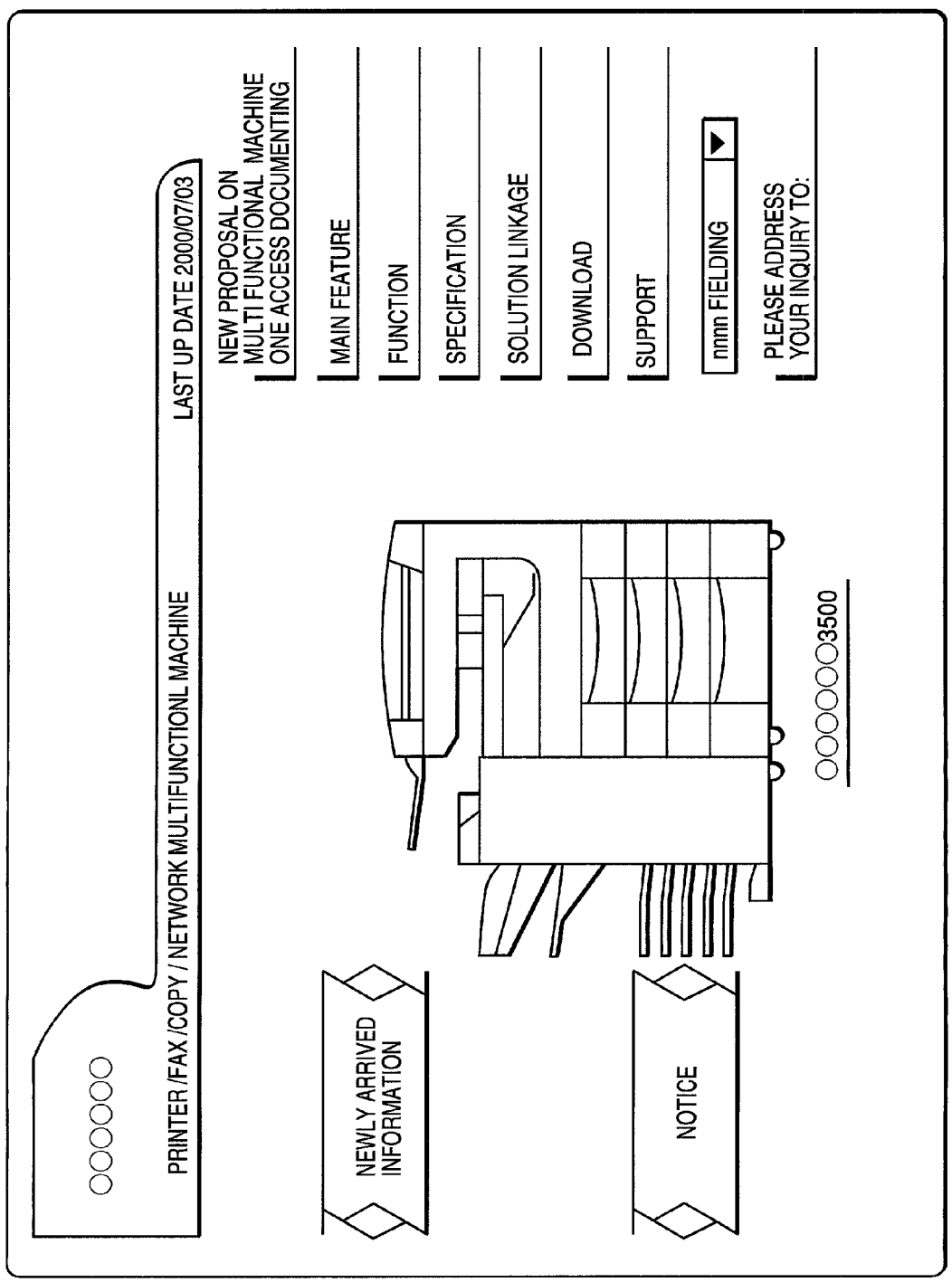
FIG. 12 illustrates an example of www server showing information supply by the management server in the embodiment of the invention.

FIG. 12 illustrates an example of www server showing information supply by the management server 6 in this embodiment of the invention. As newly arrived information, notice, newly produced multifunctional machine (one access documenting), main feature, function, specification, solution linkage, download, support and inquiry are displayed on this www server as shown in FIG. 12, the operator can select the desired item of information and shift to the matching www server.

Figure 13:
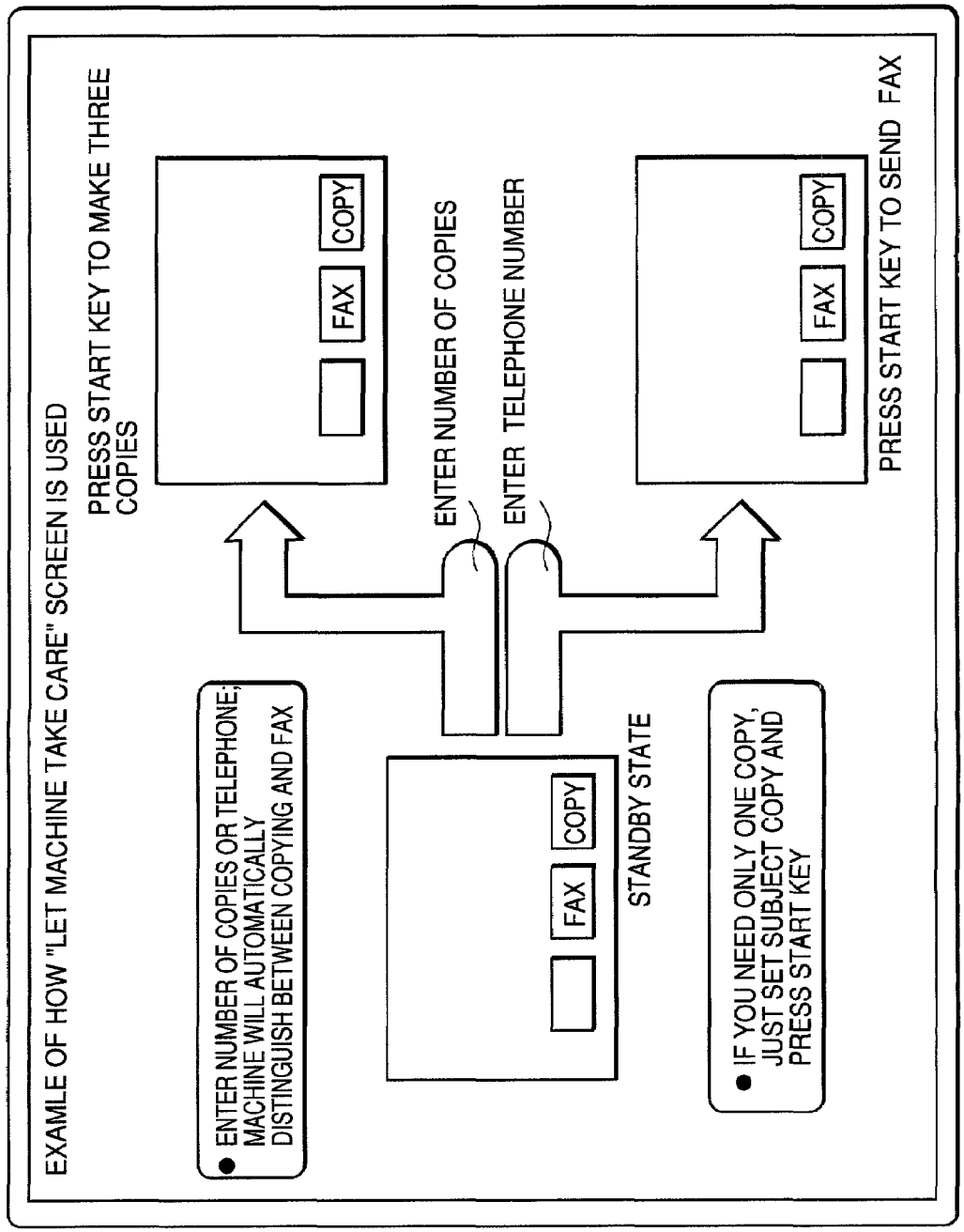
FIG. 13 illustrates an example of www server showing a handling method displayed by the management server in the embodiment of the invention.

FIG. 13 illustrates an example of www server showing a handling method displayed by the management server 6 in this embodiment of the invention. FIG. 13 shows a display of the contents of the handling method for the document input/output apparatus 1.

Figure 14:
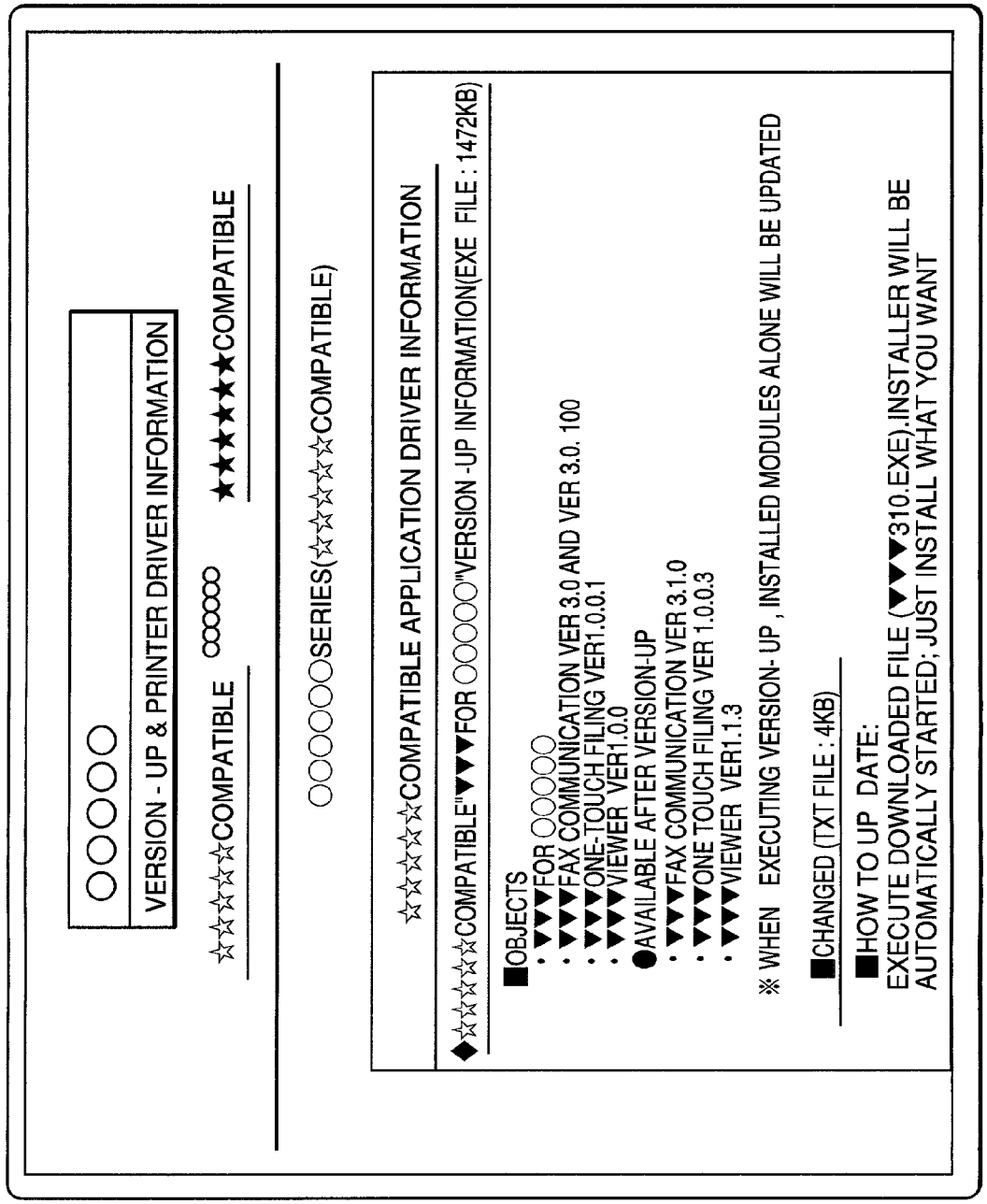
FIG. 14 illustrates an example of www server for downloading a printer driver for the document input/output apparatus and a linked application displayed by the management server in the embodiment of the invention.

FIG. 14 illustrates an example of www server for downloading a printer driver for the document input/output apparatus 1 and a linked application displayed by the management server 6 in this embodiment of the invention. By selecting the required software out of the displayed items shown in FIG. 14, the latest software can be downloaded to the PC.

Figure 15:
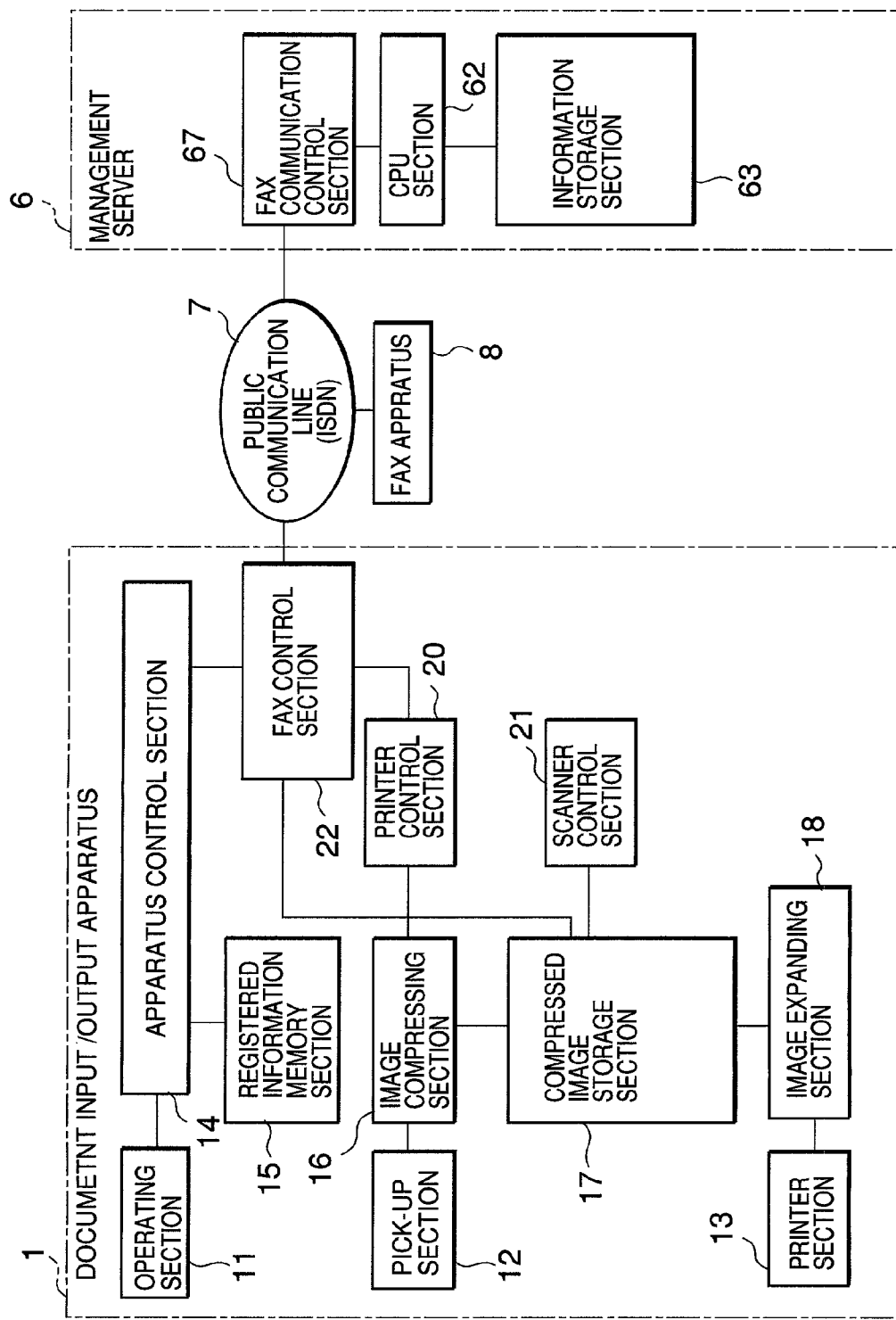
FIG. 15 is a block diagram illustrating the configuration of a document input/output system, which is another preferred embodiment of the invention.

FIG. 15 is a block diagram illustrating the configuration of a document input/output system, which is another preferred embodiment of the invention. FIG. 15 shows the configuration of the document input/output system where it is connected only to the public communication line 7.

Incidentally, the document input/output system, which is another embodiment of the invention, has the same configuration as the document input/output system, which is the earlier described embodiment of the invention, shown in FIG. 1 except that the network communication control section 19, the Internet 2, the mail server 3, the PC 4 and the Internet fax apparatus 5 of the document input/output apparatus 1 are excluded and a fax communication control section 67 is provided in place of the network communication control section 61 of the management server 6.

The document input/output apparatus 1 is connected to the management server 6 via the public communication line 7. The management server 6 exchanges information with the registered information memory section 15 of the document input/output apparatus 1 using the fax communication control section 67.

Since the user frequently has no PC connected to the Internet, this embodiment is so disposed that a fax document printed by the document input/output apparatus 1 itself, in place of an electronic mail or a www server, notifies the completion of initial registration, explains the handing method or gives a notice of the replacement timing of any expendable item.

If the document input/output apparatus 1 itself runs into trouble and can print no fax document, the trouble can be notified in a fax document from a nearby fax apparatus.

The automatic execution of the initial setting of the document input/output apparatus 1 per se by the management server 6 via a network serves to avoid faulty initial setting due to erroneous operation or the like, and thereby to enhance the reliability of the system. Furthermore, storing of registration information in the management server 6 under centralized management also contributes to enhancing the reliability of the system, because any lost information due to trouble or mishandling of the document input/output apparatus 1 per se can be restored by transferring the pertinent information from the management server 6.

Moreover, the automatic execution of the initial setting of the document input/output apparatus 1 per se by the management server 6 via a network serves to reduce the number of handling items and enables the same destination information and the like registered with the management server 6 to be shared among a plurality of document input/output apparatuses 1, so that each individual document input/output apparatus 1 need not register the same destination information and the like, resulting in enhanced handing ease.

Furthermore, it is made possible to check the operating state of the document input/output apparatus 1 per se, the remaining volumes of expendables and the presence or absence of trouble on the www server, and the replacement timing of expendables or of any hardware trouble is notified by electronic mail, resulting in capability of prompt response to the user's needs and in enhanced maintenance ease.

As hitherto described, a document input/output system according to the invention comprising at least a document input/output apparatus integrating a copying function, a facsimile function, a printing function and a scanning function, management information is communicated via a network between a management server for managing the individual items of the management information of the document input/output apparatus and the document input/output apparatus itself. This results in the advantage that it is made possible to avoid faulty initial setting due to erroneous operation or the like, and to readily restore any lost information due to trouble or mishandling of the document input/output apparatus per se by transferring the pertinent information from the management server, resulting in enhanced reliability of the system.

Moreover, another document input/output system according to the invention, provides the advantage that, by combining the information from a connection contract required for communication between the document input/output apparatus and the management server via a network with the information from a sales contract for the document input/output apparatus, it is made possible to reduce the number of handling items and thereby to enhance the handing ease.

Furthermore, in still another document input/output system according to the invention, by using a means for transmitting and receiving electronic mails and a means for displaying contents on the Internet of each of the document input/output apparatus and the management server, a terminal unit connected to the network is provided with at least the completion of the initial setting procedure, the confirmation of the hardware state, the additional registration of any apparatus, installation of software in the terminal unit, a notice of the replacement timing of expendables used by the printing function and a notification of any hardware trouble. This provides the advantage that the operating state of the multifunctional machine per se, the remaining volumes of expendables and the presence or absence of trouble on the www server can be readily checked, resulting in enhanced maintenance ease.

What is claimed is:

1. A document input/output system comprising:
    a document input/output apparatus connected to a network;
    a management server which manages the document input/output apparatus and stores initial registration data of the document input/output apparatus; and a messaging server which communicates operating status information of the document input/output apparatus from the document input/output apparatus to the management server via the network,
    wherein the initial registration data is stored in the management server prior to connection of the document input/output apparatus to the network and transmitted from the management server to the document input/output apparatus when the document input/output apparatus is installed at a user location and connected to the management server via the network, said document input/output apparatus storing the initial registration data that is received from the management server to complete an initial registration with the management server,
    wherein the document input/output apparatus accesses the messaging server using the initial registration data to transmit the operating status information to the management server.

2. The document input/output system claimed in claim 1, wherein the messaging server is an electronic mail server and the initial registration data includes user name and password data for sending and receiving electronic mail on the electronic mail server,
    wherein the document input/output apparatus transmits the operating status information to the management server via an electronic mail message using the initial registration data that is received.

3. The document input/output system claimed in claim 2 further comprising a user computer, which is connected to the network,
    wherein the document input/output apparatus transmits the operating status information to the management server via the electronic mail server, and the management server retrieves the operating status information from the electronic mail server and notifies the user computer of the operating status of the document input/output apparatus via the electronic mail server.

4. The document input/output system claimed in claim 3, wherein the document input/output apparatus further includes a hyper-text transfer protocol (HTTP) server which stores the operating status information of the document input/output apparatus and the user computer accesses the HTTP server to manage the document input/output apparatus using IP address data included in an electronic mail message from the management server which specifies an IP address of the document input/output apparatus.

5. The document input/output system claimed in claim 3, wherein the management server notifies the user computer that the document input/output apparatus is low on an expendable item via the messaging server based upon the operating status information that is received from the document input/output apparatus.

6. The document input/output system claimed in claim 1, wherein at least one of a completion of an initial setting procedure of the document input/output apparatus, a confirmation of a hardware state of the document input/output apparatus, an additional registration of any new apparatus, an installation of software in the document input/output apparatus, a notice of a replacement timing of expendables used by a printing function of the document input/output apparatus, and a notification of any hardware trouble in the document input/output apparatus, are communicated via the messaging server to at least one of said document input/output apparatus and said management server.

7. The document input/output system claimed in claim 1, further comprising at least one other document input/output apparatus which is managed by the management server, wherein at least part of management information which is sent to each document input/output apparatus from the management server is identical.

8. The document input/output system claimed in claim 7, wherein the at least part of the management information that is identical comprises at least one of shortened dial number information and one-touch dial number information which is stored in the management server prior to connection of the document input/output apparatus to the network.

9. The document input/output system claimed in claim 1, wherein
at least one of a completion of an initial setting procedure of the document input/output apparatus, a confirmation of a hardware state of the document input/output apparatus, an additional registration of any new apparatus, an installation of software in the document input/output apparatus, a notice of a replacement timing of expendables used by a printing function of the document input/output apparatus, and a notification of any hardware trouble in the document input/output apparatus, are communicated via a display on at least one of said document input/output apparatus and said management server.

10. The document input/output system claimed in claim 1, wherein the initial registration data further includes connection information which is entered in the management server prior to connection of the document input apparatus to the network as part of combined information from a connection and sales contract for said document input/output apparatus.

11. The method claimed in claim 1, wherein the initial registration data includes connection information which is entered in the management server prior to connection of the document input/output apparatus to the network as part of combined information from a connection and sales contract for said document input/output apparatus.

12. The document input/output system claimed in claim 1, wherein the initial registration data includes network address information of the messaging server which identifies the messaging server among a plurality of devices connected to the network,
wherein the document input/output apparatus uses the address information to transmit the operating status information to the messaging server at a network address specified by the network address information.

13. The document input/output system claimed in claim 1, wherein the messaging server is connected to the network at a location remote to the document input/output apparatus.

14. A method for setting information in a document input/output system comprising at least a document input/output apparatus connected to a network, a management server which manages the document input/output apparatus, and a messaging server which communicates operating status information of the document input/output apparatus to the messaging server via the network, the method comprising:
storing, in the management server, initial registration data of the document input/output apparatus prior to connection of the document input/output apparatus to the network;
transmitting, from the management server, the initial registration data to the document input/output apparatus when the document input/output apparatus is installed at a user location and connected to the management server via the network;
storing, in the document input/output apparatus, the initial registration data that is received from the management server to complete an initial registration with the management server; and
accessing, by the document input/output apparatus, the messaging server using the initial registration data to transmit the operating status information to the management server.

15. The method claimed in claim 14, wherein the messaging server is an electronic mail server and the initial registration data includes user name and password data for sending and receiving electronic mail on the electronic mail server,
wherein the document input/output apparatus transmits the operating status information to the management server via an electronic mail message using the initial registration data that is received.

16. The method claimed in claim 15, wherein the document input/output apparatus transmits the operating status information to the management server via the electronic mail server, and the management server retrieves the operating status information from the electronic mail server and notifies a user computer, which is connected to the network, of the operating status of the document input/output apparatus via the electronic mail server.

17. The method claimed in claim 16, further comprising:
storing the operating status information in a hyper-text transfer protocol (HTTP) server included in the document input/output apparatus; and
accessing, by the user computer, the HTTP server to manage the document input/output apparatus using IP address data included in an electronic mail message from the management server which specifies an IP address of the document input/output apparatus.

18. The method claimed in claim 14, further comprising:
communicating at least one of a completion of an initial setting procedure of the document input/output apparatus, a confirmation of a hardware state of the document input/output apparatus, an additional registration of any new apparatus, an installation of software in the document input/output apparatus, a notice of a replacement timing of expendables used by said document input/output apparatus, and a notification of any hardware trouble, via the messaging server to at least one of said document input/output apparatus and said management server.

19. The method claimed in claim 14, wherein at least one other document input/output apparatus is managed by the management server and at least part of management information which is sent to each document input/output apparatus is identical.

20. The method claimed in claim 19, wherein the at least part of the management that is identical comprises at least one of shortened dial number information and one-touch dial number information which is stored in the management server prior to connection of the document input/output apparatus to the network.

21. The method claimed in claim 14, wherein the management server notifies the user computer that the document input/output apparatus is low on an expendable item based on the operating status information that is received from the document input/output apparatus.

22. The method claimed in claim 14, further comprising displaying at least one of a completion of an initial setting procedure of the document input/output apparatus, a confirmation of a hardware state of the document input/output apparatus, an additional registration of any new apparatus, an installation of software in the document input/output apparatus, a notice of a replacement timing of expendables used by a printing function of the document input/output apparatus, and a notification of any hardware trouble in the document input/output apparatus on a display in at least one of said document input/output apparatus and said management server.

23. The method claimed in claim 14, wherein the initial registration data includes network address information of the messaging server which identifies the messaging server among a plurality of devices connected to the network,
    wherein the document input/output apparatus uses the address information to transmit the operating status information to the messaging server at a network address specified by the network address information.

24. The method claimed in claim 14, wherein the messaging server is connected to the network at a location remote to the document input/output apparatus.

\* \* \* \* \*